O. COOGAN.

BARK-MILL.

No. 7,143. Reissued May 30, 1876.

Witnesses:
Granville Lewis
M. Church

Inventor
Orsen Coogan
By Alex. Ellsworth & Son
Atty's Attys.

UNITED STATES PATENT OFFICE.

OWEN COOGAN, OF PITTSFIELD, MASSACHUSETTS.

IMPROVEMENT IN BARK-MILLS.

Specification forming part of Letters Patent No. 120,246, dated October 24, 1871; reissue No. 7,143, dated May 30, 1876; application filed May 13, 1876.

*To all whom it may concern:*

Be it known that I, OWEN COOGAN, of Pittsfield, in the county of Berkshire and State of Massachusetts, have invented a new and Improved Bark-Mill; and I do hereby declare the following to be a full, clear, and exact description of the same, reference being had to the accompanying drawings, forming part of this specification, in which—

Figure 1:
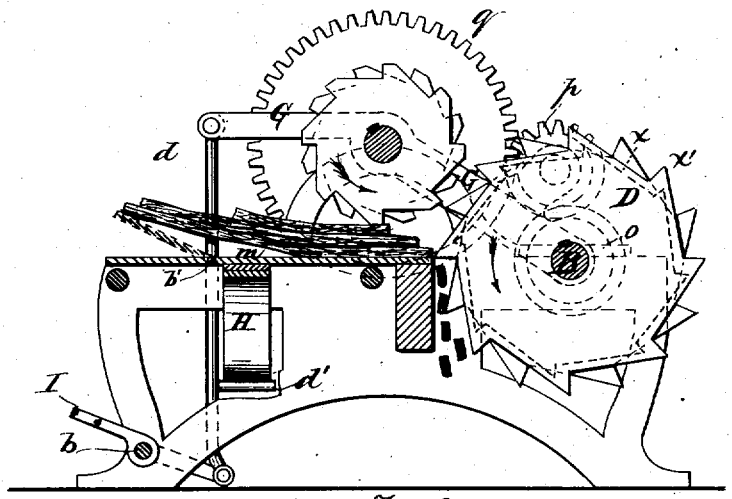
Figure 2:
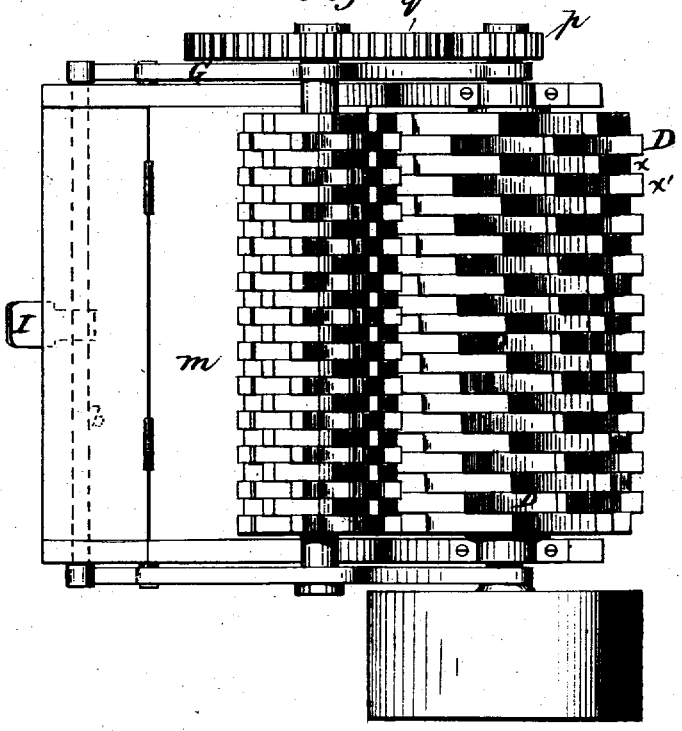

Figure 1 represents a vertical transverse section of my improved bark-mill, and Fig. 2 is a top-plan view of the same.

Similar letters of reference denote the same parts.

The object of my invention is to reduce bark, whether in a dry, damp, or green state, to a condition fit for tanners' use. It consists of certain details of construction fully described in this specification.

In carrying my invention into practice I have provided a fixed feed-table, on which the bark is placed and fed forward. Opposite the edge of this, and moving closely past it, are suitable cutting-teeth, which project from the surface of a revolving cylinder, the action of the teeth being, in connection with the feed-table, to shear or cut the edge of the bark.

As represented in the drawings, this toothed cylinder is composed of a series of disks, D D, which are mounted upon a shaft, B. These disks, with their teeth, are in the general form of an ordinary circular saw, and the action of the teeth is analogous to that of the teeth of such a saw. These disks may be made of any suitable thickness, depending upon the width of the pieces to which it is desirable to reduce the bark. They are represented in the drawings, Fig. 2, as fixed upon the shaft, so as to bring the teeth in lines slightly spiral, the last tooth of any row being just in front of the line of the first tooth of the succeeding row. The teeth may also have an alternate arrangement, as shown at *x x'*, in Figs. 1 and 2, and the intervening lower part of the disks, as at *x*, Fig. 2, may be formed with smaller teeth, for the purpose of clearing the machine. The shaft B is mounted in the frame of the machine, in about the same horizontal plane as the feeding-table *m*. On one end of the shaft B is a suitable pulley, and on the other a pinion, *o*. This pinion, through the idle-wheel *p*, drives the gear-wheel *q*, fixed on the shaft of the feed-roller. This feed-roller is located directly over the feed-table, and is hung in bearings in the levers G G, which are pivoted upon the shaft B. The idle-wheel is pivoted on an arm, *g*, of one of the levers G. These levers extend to the front of the machine, and are connected, by rods *d*, to arms upon the end of a shaft, *b*, in the lower and front part of the frame. Suitably connected to these rods are the ends of a semi-elliptical spring, H, which serve to draw down the arms G, and thereby cause the feed-roller to press upon the bark on the feeding-table. This construction permits the feed-roller to adjust itself to the inequalities of the bark, and keeps it always in contact therewith. From the shaft *b* a treadle, I, projects forward, by which the feed-roller may be conveniently lifted from the bark.

The construction of the feed-roller which I have shown resembles that of the cutting-cylinder. It is made up of a series of disks, like a circular saw, but with truncated teeth, as shown more clearly in Fig. 1. These, as they are pressed by the spring into contact with the bark, feed it forward steadily, and hold it for the action of the cutting-instrument.

The proportions of the driving-gears are obviously such as to give the feed-roller much slower rotation than that of the cutting-cylinder.

The front part of the feeding-table may be hinged, as shown at *b'*. This may sometimes be convenient to elevate the bark and allow it to slide to the feeder by its own weight.

The levers G, being pivoted upon the shaft B, from which motion is derived through the gears, keep these gears always in the same relation to each other, whatever the position of the feed-roller.

The cutting-points may be made removable, in order that they may be replaced when worn.

In the operation of the machine which I have described the bark is fed over the table, and must be pressed forward and held firmly against the cutters. This is accomplished by the feed-roller, which, as before described, both feeds and holds the bark. The cutters, striking closely past the feeding-table, cut to any degree of fineness, depending upon the relative speed of the feed-roller and cutters, the edge of the bark presented to them.

In the arrangement of cutters shown the bark will be cut into fragments of definite size, depending upon the feed and thickness of the teeth; but the construction is such that any arrangement of the teeth will shear across the ends of the bark, and reduce it to small fragments of uniform size.

I claim as my invention—

1. In a bark-mill, the weighted lever G, carrying an idle-wheel which communicates motion from the shaft of the cutters to the feed-roller.

2. A feed-roller, connected to pressure levers which are adapted to raise or depress the feed-roller, as set forth.

3. In a bark-mill, the levers G, carrying the shaft of the feeder, and in an arm of one the idle-wheel *p*, said levers being pivoted upon the shaft of the cutting-cylinder and depressed at the opposite ends, as set forth.

4. The levers G, carrying the feeder-rods *d d*, arms *d'*, spring H, and treadle I, all combined to operate as set forth.

5. In a bark-mill, the cutting-cylinder composed of disks having teeth *x x'*, set alternately, as set forth.

OWEN COOGAN.

Witnesses:
W. T. COOGAN,
I. C. CULLEN.